United States Patent [19]
Hill

[11] 3,872,590
[45] Mar. 25, 1975

[54] ELECTRICIANS TOOLS

[76] Inventor: James L. Hill, 7012 Azalea St., Bakersfield, Calif. 93306

[22] Filed: May 20, 1974

[21] Appl. No.: 471,307

[52] U.S. Cl. .................................... 30/90.6, 7/5.1
[51] Int. Cl. .................................... H02g/1/12
[58] Field of Search ............... 7/5.1, 4 R, 3 R, 30/90.6, 90.8, 91.1; 81/9.5 R

[56] References Cited
UNITED STATES PATENTS

| | | | |
|---|---|---|---|
| 2,421,049 | 5/1947 | Bell | 30/91.1 |
| 2,830,367 | 4/1958 | Seymour | 81/9.5 R |
| 3,014,387 | 12/1961 | Medlin | 30/90.6 X |

Primary Examiner—Al Lawrence Smith
Assistant Examiner—Roscoe V. Parker
Attorney, Agent, or Firm—Grover A. Frater

[57] ABSTRACT

A double ended electricians' hand tool has a cable insulation slicer at one end and insulation pinch-off and conductor twisting blades at the other end. The pinch-off blades serve as a stop for slicer action and the slicer structure serves as a grip for the pinch-off and twist blades. The pinch-off blades are formed so that they extend laterally from the tool in a greater degree on one side than on the other. The resultant tool can be used to strip insulation from wires and cables beginning at a point inside a junction box.

10 Claims, 6 Drawing Figures

PATENTED MAR 25 1975 3,872,590
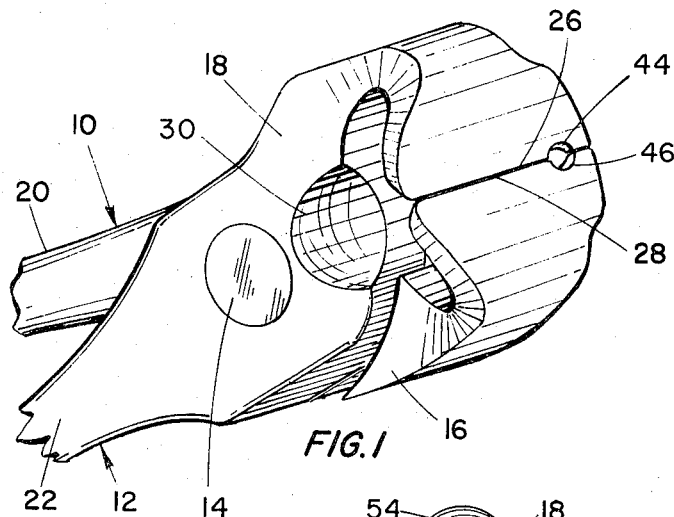
FIG.1
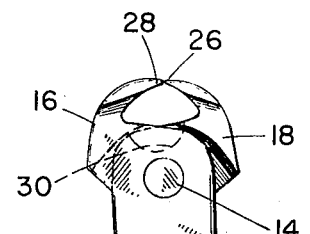
FIG.6
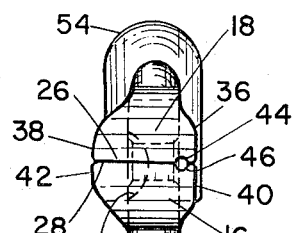
FIG.5   FIG.4
FIG.2
FIG.3

ELECTRICIANS TOOLS

BACKGROUND

This invention relates to improvements in insulation stripping tools of the kind employed by electricians.

It is basic to the electricians' trade to be able to strip insulation from electrical conductor wires. The insulation is almost invariably made from a material that may be cut with a sharp blade with relative ease. Certainly that is true of the insulated wires employed in building construction. The task can be accomplished with no more than an ordinary pocket knife. However, economic and safety requirements have given rise to the development of special tools for accomplishing that function. A number of tools are available and they are effective in varying degrees. Insulation packages for wire differ and the tools that have been effective for one insulation arrangement have proven to be less satisfactory for other arrangements. No tool has been found which is adequate for stripping insulation from wires at a point within a small junction box. Heretofore, it has been necessary for the electrician to provide enough wire at the box so that the end of the wire will extend from the box wherefor the insulation may be trimmed from the end at the exterior of the box, rather than inside the box.

It is an object of this invention to provide an insulation stripping tool which performs well in stripping insulation from a wide variety of wire packaging arrangements and which will strip any of them inside the box so that an additional length of wire need not be provided. That latter point is particularly important. An excess amount of wire must be bent back and stored in the box, and there is always danger that the insulation of a length of wire so stored will be pierced in the course of further work in that junction box.

An insulation stripping tool is used so frequently during the course of installing the wiring in a construction project that it is important that the tool design be such that the electrician can pick it up and put it down, and grasp it and carry it around in a way that is convenient and that "feels right", and will enable him to handle it without getting cut or otherwise hurt without any need to look at it before grasping the tool. To provide a tool of that kind is another object of the invention and one that is considered especially important. Other objects are to provide a tool which is capable of manufacture in relatively inexpensive form, but a form which is sufficiently reliable and strong and dependable for commercial use.

Another object of the invention is to provide a single tool which an electrician can use for stripping many of the wires that he is likely to encounter during the course of his work. The vast majority of those wires will be solid rather than stranded, although the tool is capable of stripping stranded wires as well as solid wires. They are circular in cross-section. Single conductor wires are almost always covered by an insulation whose outer periphery is circular. In some cases, several conductors so insulated are combined either in a larger insulating sheath of plastic, or cloth, or paper. Tools made according to the invention are capable of dealing with that kind of construction.

That kind of conductor package is called a nonmetallic shielded cable. In some cases, it may include paper or cord filler material. Tools made according to the invention are capable of dealing effectively with cables that include such filler materials. In some cases, the non-metallic shielded cable is circular in cross-section. Sometimes, the cable is oval shaped. The invention is applicable to both of those constructions. Sometimes the several conductors are molded into a single unitary plastic sheath that serves both to encompass and to space the wires. The invention is equally useful in connection with that kind of shielded cable. Again, it is an object to provide a tool which can be used to strip insulation from the end of conductors in any of these kinds of insulation packages, notwithstanding that the end of the wire, or at least the point on the wire at which insulation stripping is to begin, is disposed within a junction box.

SUMMARY

These and other objects and advantages of the invention which will hereinafter appear, are realized in part in the invention by the provision of a stripping tool of the plier class, wherein a pair of members pivoted to one another along their length, is shaped so that each is formed at one end into a jaw that cooperates with the jaw of the other, and so that each is formed at its other end into one of a pair of handles which, when squeezed together, cause those members to pivot, tending to close the jaws. The jaws are formed into a pair of pinch blades that close upon one another along a line that is substantially parallel to the pivot. At least one of the jaws is notched at a point along the length of its pinch blade to receive a wire conductor. The jaw is sharpened around the periphery of that notch to form a cutter for insulation which surrounds the wire which is disposed in the notch. A preferred form of the invention includes a slicing blade fixed to the distal end of one of the handles and moveable toward the other handle when the handles are squeezed together. A shroud fixed to one of the handles is arranged so that it straddles the other handle when they are squeezed. Together they form a channel into which the slicing blade extends. The channel, or passageway, serves as a guide for relative movement between a wire to be stripped and the slicing blade. In the preferred form, the jaws are arranged so that the pinching blades extend laterally to one side of the vertical center line of the tool than they do to the other. The notch, previously described, is formed on the short side of the blades. The tool is double ended. To slice the sheath, the tool is held with its jaws toward the heel of the hand and the sheath to be sliced is placed between the handles at their distal end. Squeezing the handle drives the slicing blade into the sheath which is then slit by drawing the tool lengthwise past the end of the sheath. The tool is then turned around and the pinch blades are used to pinch off the sheathing material that has been laid open by the slicing blade. Whatever insulation remains on the conductor is sliced through and pulled off by the pinching blades and the sharpened notch edges. The tool is placed over the conductor so that the conductor is aligned with and is directed into the notch. Squeezing the handles results in cutting all but the conductor. Pulling the tool pulls the insulation from the conductor.

The jaws and the slicing blade, and a shroud that fits over that blade and protects it, are all interrelated so that their functions are coordinated. Even when the jaws are not used to perform a pinching function, they come together to form a stop which controls the degree in which the slicing blade held by one handle can be moved toward the opposite handle. Conversely, the shroud serves as part of the handle while performing pinch-off functions.

DRAWING

In the drawing

FIG. 1 is a pictorial view of the jaws of the tool that embodies the invention;

FIG. 2 is a view of the tool in side elevation;

FIG. 3 is a view of the tool in bottom elevation;

FIG. 4 is a sectional view taken on line 4—4 of FIG. 3;

FIG. 5 is a view in elevation of the handle end of the tool looking from the handle end; and FIG. 6 is a view in elevation of the jaw end of the tool looking from the jaw end.

FIG. 1 illustrates that the jaws of the tool are shaped generally like the jaws of a pinch-off hand tool of a kind that employs a scissors or plier action. Significant differences are the inclusion of a conductor stripping notch near one side edge of the pinch blades, extension of the pinch blades laterally in one direction more than in the other, and the fact of the inner jaw at one side is cut away to facilitate pinch-off of bulky insulation strips. There are other significant differences to be explained below.

The tool is shown in side elevation in FIG. 2. It is formed by two elongated members, 10 and 12, which are pivoted together at an intermediate point along their length by the pivot pin 14. At one side of the pivot 14 the two members are formed into a pair of cooperating jaws. Member 10 includes jaw 16 and member 12 includes jaw 18.

At the other side of the pivot 14 the two members are formed into a pair of handles. Member 10 is formed into handle 20 and member 12 is formed into handle 22. The distal ends of those handles, the ends away from the pivot 14, are arranged to form a slicing tool. The distal end of handle 20, in this embodiment, carries a slicing blade and is formed into a shroud which protects that blade and straddles the distal end 24 of the handle 22.

Returning to the jaw end of FIG. 2, the two jaws terminate in cooperating pinch blades. Pinch blade 26 is formed on jaw 18 and pinch blade 28 is formed on jaw 16. One jaw, 18, is partly cut away in the region at the rear of the jaw adjacent to the pivot. It is cut away to provide added clearance whereby to avoid interference with bulky insulation which is to be pinched off by the blades. The region of that cutout is designated 30.

The pinch blades are arranged so that they engage one another on a line that extends substantially parallel to the axis of the pivot 14. That feature is not essential to successful operation of the invention, but it is the preferred form. Moreover, it is preferred that the line on which the pinch blades meet lie in a plane that contains the axis of the pivot 14 and which constitutes, substantially, the transverse mid-plane through the tool. Thus arranged, the pinch blades meet in the plane that extends midway between the intermediate regions of the two handles 20 and 22. That orientation facilitates using the tool to hold a pair of conductor wires and to twist them together by rotating the tool by turning the handle.

The pinch blades are elongated so that they have substantially greater width than does the tool structure in the region of the pivot. That feature is best seen in FIG. 3. The pinch blades are arranged so that they extend laterally more in one direction than they do in another. That feature may be seen in FIGS. 1, 3 and 6.

One of the primary objects of the invention is to provide a tool that may be used to strip insulation from sheathed cable and insulated conductors beginning at a point inside of a conventional conjunction box, even a small one. To do that requires that the tool be inserted into the box alongside the cable or conductor. To that end, the pinch blades are arranged so that they extend laterally beyond the surface planes that mark the width of the tool in the region of the pivot. In FIG. 3, surface 32 of member 12 lies in one of those surface planes. Surface 34 of member 10 lies in the other of those surface planes. It is jaw 16 that is visible in FIG. 3. Jaw 16 forms part of handle 10. It extends laterally at side 42 past the plane of surface 32 and it extends laterally at edge 40 past the plane that contains surface 34. Edge 42 extends laterally from the plane of surface 32 more than edge 40 extends laterally from the plane of surface 34. Turning to FIG. 6, edge 40 of jaw 16 corresponds to edge 36 of jaw 18, and edge 42 of jaw 16 corresponds to edge 38 of jaw 18. Edges 38 and 42 extend laterally to make it possible and convenient to pinch off thick and bulky pieces of insulation material that extend generally back along the tool from a point inside the box. Edges 36 and 40 extend laterally so that notches 44 and 46, which are formed in pinch blades 26 and 28, respectively, can be located at a point substantially adjacent to, but outside of, the surface plane that contains the surface 34. The notches 44 and 46 together form an opening just large enough to accommodate a conductor wire of intermediate size. The two notches can be replaced with a single notch which is formed entirely in one or the other of the two pinch-off blades.

In the preferred form of the invention, two notches are employed, one in each of the two pinch-off blades and together they form an opening of size to accommodate a number 14 wire conductor. As best shown in FIG. 1, the margins of the notches are sharpened so that the insulation surrounding a conductor wire located between the pinch-off blades, and aligned with the notches, will be sliced through when the jaws and the pinch-off blades are closed. When the tool is used to strip insulation from smaller diameter conductors, the insulation will not be cut entirely through, but any portion that remains uncut will be parted when the user pulls the tool away from the point on the conductor at which the jaws were clamped together. When the wire conductor is larger in diameter than the diameter of number 14 wire, the electrician applies less pressure and does not entirely close the jaws. That avoids cutting the conductor as he pulls the tool to strip the severed section of insulation from the conductor.

It is not essential that the edges 36 and 40 extend laterally less far than the edges of 38 and 42. However, that is the preferred construction. The lesser lateral extension permits the tool to be used conveniently when the wire to be stripped tends to lie against, or bear gainst, the side of the junction box. It is preferred that the notches be arranged so that the inner edges of the notch lie substantially in the plane of one side of the pivot region of the tool whereby that portion of the tool can be used as a guide. The guide is useful for locating the wire in the notch when the notch is not visible to the user of the tool. For this purpose, it is preferred that that side of the tool on which the notch is located have a flat surface in the region of the pivot. The flat surface is simply laid alongside the end region of the conductor to be stripped after opening the jaws so that they straddle the wire. When the jaws are closed, the conductor is directed into the notch.

Some cable sheaths include very substantial thicknesses of insulation material and filler material. To facilitate pinching off that material deep inside a small junction box, the preferred embodiment of the invention has a portion of the inner jaw cut away at the side at which the pinch-off blades have the greater lateral extension. That arrangement makes it possible to accommodate a larger bulk and thickness of insulation material between the pinch-off jaws. To make that point clear, a dotted line 50 has been added to FIGS. 3 and 6. That line marks the surface that remains after the cutout is formed.

The distal end of the two handles 20 and 22 have a special shape for several reasons. One of those reasons is to form a handle structure that permits grasping the tool in a way that minimizes the need to place the user's hand at a point where it might tend to obscure vision. Vision into a small junction box tends to become obscured as tools are moved to pry and twist within the box. To avoid this problem, the distal end 52 of handle 20 is offset laterally in the direction of the distal end 24 of handle 22. It is made thicker to form a heel 54 which fits in the heel of the user's hand. The purpose is to facilitate application of powerful squeezing action without need to readjust the position of the hand on the handles to a position in which vision might be obscured.

The pinch-off blades and notch are adequate to remove insulation from single conductors. When several conductors are packaged together in what is usually called "non-metallic sheathed cable", it is necessary to slice the cable and insulation lengthwise of the wire for a distance equal to the length of conductor that is to be laid bare. In some kinds of cable, insulated single conductors are housed together in additional quantities of insulation material. In such a case, the additional quantity of insulating material must first be sliced and pinched off to afford access to the insulated conductors whose insulation is then removed using the pinch-off end of the tool.

Slicing is accomplished at the slicing end of the tool. That is the lower end in FIG. 2 and the right end in FIG. 3. It is the end shown in FIGS. 4 and 5. The distal end 52 of handle 20 is enlarged both in thickness and in breadth. It is slotted along its vertical mid-point and a slicing blade 60 is mounted in the slot. It is held so that the sharp edge 62 and the point 64 of the blade extend from the slot 66 toward the distal end 24 of handle 22. The blade 60 is held in place by a set screw 68 which turns freely in the handle at one side of the slot and is threaded into the handle at the opposite side of the slot. Tightening the set screw pinches the sides of the slot against the blade and holds it against rotation. The set screw is formed with a screwdriver kerf 70 by which it may be tightened.

That part of end 52 which is offset toward end 24 of handle 22 is formed with a recess which extends lengthwise of the tool and is symmetrical about the vertical center line of the tool. The recess serves to form a channel. The blade 62 extends into that channel on its mid-axis. The sides of the channel serve as a shroud for the blade. For identification, those sides are labelled 80 at the right and 82 at the left in FIG. 5. The sides 80 and 82 form a protective shroud for the blade, and that shroud cooperates with the end 24 of handle 22 to form a passageway for a cable whose insulation is to be sliced. To use the tool for slicing, it is turned around so that the handle end of the tool faces the end of the cable to be stripped. The handles are spread apart and the end of the cable is positioned between them so that the point at which the cable slitting is to start is adjacent to the point 64 of the blade. The handles 20 and 22 are then squeezed together so that the end 24 of handle 22 forces the cable into the passageway formed by the handle end and the shroud such that the cable insulation is pierced by the knife 60. Tension on the handles is adjusted so that the knife can be drawn relative to the cable. It is pulled so that the knife is drawn toward the cable end, slicing the cable insulation as it proceeds. The distal end 24 of handle 22 is made arcuate. It is bowed toward the knife in a way that reduces the passageway dimension to smallest dimension at a point toward the pivot 14 from the blade 60. Thus, the cable is pressed to flatest condition just prior to entering the knife as the tool is drawn to the end of the cable.

In the preferred form of the invention, the handles and distal ends of those handles are shaped so that the end 24 does not touch the bottom of the shroud channel formed by end 52 and its sides 80 and 82. The jaws close to prevent the handles from touching. That arrangement ensures that the jaws can be fully closed and it provides a passageway of minimum size for slicing small cables that are oval shaped in that cross-section. It is preferable for that oval cable slicing application that the blade extend entirely across the passageway. Such an arrangement is shown in the drawing. A cutout, more particularly a groove 84, is formed in the surface of end 24 of handle 22, and that groove accommodates the point 64 of the blade when the handles are fully closed.

I claim:

1. In an electrician's insulation stripping tool of the plier class wherein a pair of members pivoted to one another at an immediate point along their length, are shaped such that each is formed at one end into a jaw that cooperates with the jaw of the other and such that each is formed at its other end into one of a pair of handles which handles, when squeezed together, cause said members to pivot such that said jaws are squeezed in a direction intending to close them, the improvement which comprises:

said jaws being formed into a pair of pinch blades that close upon one another along a line that is substantially parallel to the axis of said pivot;

at least one of said jaws being notched at a point along the length of its pinch blade to receive a conductor wire, the jaw being sharpened around the periphery of said notch to form a cutter for insulation associated with a wire disposed in said notch one of said members is formed with a flat outer surface at the side away from the other of said pair of members in the region from its jaw to the pivot;

said one of said jaws being formed with the inner edge of said notch lying substantially in the plane containing said flat surface whereby said surface can serve as a gauge for location of a wire to be stripped when the notch is hidden from the inner's view.

2. The invention defined in claim 1 in which the members of said tool are pivoted together such that their outer surfaces, in the region in which they are pivoted, rotate through parallel surface planes one of which is substantially coincident with the plane containing said flat surface;

the jaws being formed such that the pinch blades extend to a point more distant from the surface plane at the side away from said flat surface than said pinch blades extend beyond the surface plane which contains said flat surface, whereby the pinch blades extend less far laterally at the side of which said notch is formed.

3. The invention defined in claim 2 in which the outer surface of the other of said members is cut away in the region between the pivot and the jaws whereby to accommodate a member of larger cross-sectional area between the pinch blades at the side of the tool away from said notch.

4. The invention defined in claim 2 which further comprises a slicing blade carried on the distal end of the handle of one of said members and extending toward the other handle.

5. The invention defined in claim 4 which further comprises a shroud carried by the handle on which the slicing blade is mounted, said shroud extending past said slicing blade on opposite sides thereof in the direction of relative movement of said handles a distance sufficient to contain the distal end of the other handle when the pinch jaws of the tool are closed.

6. The invention defined in claim 5 in which said other handle is formed with a cutout to receive an end of said slicing blade, said slicing blade extending from said one handle a distance sufficiently great to extend into said cutout of said other handle when the handles are squeezed together such that said jaws are closed.

7. The invention defined in claim 1 which further comprises:

a slicing blade carried at the distal end of one handle and extending toward the distal end of the other handle.

8. The invention defined in claim 7 which further comprises a shroud carried by a first one of said handles and being moveable therewith to straddle the distal end of the second one of said handles such that said shroud and said distal end of said second handle form a passageway for sheathed cable into which passageway said slicing blade extends when said handles are squeezed.

9. The invention defined in claim 8 in which said shroud is integrally formed with said first handle and is offset from the plane of the remainder of said first handle toward the second handle.

10. The invention defined in claim 9 in which the pinch blades of the jaws extend, relative to the mid-plane that extends perpendicular to the pivot axis of the tool, laterally in greater degree toward one side of said mid-plane than they extend toward the opposite side of said mid-plane.

* * * * *